United States Patent [19]

Poston et al.

[11] Patent Number: 4,490,831
[45] Date of Patent: Dec. 25, 1984

[54] DIGITAL PULSE DETECTOR CIRCUIT HAVING SELECTABLE FALSE ALARM RATE

[75] Inventors: Billy R. Poston; Stuart L. Atkinson, both of St. Petersburg, Fla.

[73] Assignee: E Systems, Inc., Dallas, Tex.

[21] Appl. No.: 471,220

[22] Filed: Mar. 1, 1983

[51] Int. Cl.³ ............................................. H04L 27/06
[52] U.S. Cl. ...................................... 375/94; 364/574; 375/99; 328/151
[58] Field of Search .......................... 364/574; 371/6; 343/7 R, 7 A, 7.7, 5 DP; 375/94, 96, 99; 328/110, 117, 151, 164

[56] References Cited

U.S. PATENT DOCUMENTS

| | | | |
|---|---|---|---|
| 3,374,479 | 3/1968 | Moore | 343/7 |
| 3,557,354 | 1/1971 | Trimble . | |
| 3,614,626 | 10/1971 | Dillard | 375/99 |
| 3,701,149 | 10/1972 | Patton et al. | 343/5 DP |
| 3,716,849 | 2/1973 | Metcalf | 340/347 |
| 3,787,668 | 1/1974 | Currie et al. . | |
| 3,797,014 | 3/1974 | Tompkins et al. | 343/5 DP |
| 3,829,845 | 8/1974 | Means . | |
| 3,829,858 | 8/1974 | Bergkvist | 343/7 A |
| 3,925,650 | 12/1975 | Brown . | |
| 3,995,270 | 11/1976 | Perry et al. | 343/7 A |
| 4,013,998 | 3/1977 | Bucciarelli et al. . | |
| 4,062,012 | 12/1977 | Colbert et al. | 343/7 A |
| 4,093,948 | 6/1978 | Long | 343/7 A |
| 4,095,222 | 6/1978 | Mooney, Jr. | 343/7 A |
| 4,099,075 | 7/1978 | Goldberg et al. | 328/117 |
| 4,099,182 | 7/1978 | Ward | 343/17.2 PC |
| 4,101,889 | 7/1978 | Evans | 343/7.7 |
| 4,145,743 | 3/1979 | DiCiurcio | 364/605 |
| 4,159,477 | 6/1979 | Le Beyec | 343/7 A |
| 4,353,119 | 10/1982 | Daniel et al. | 364/574 |
| 4,358,846 | 11/1982 | Morgan | 371/6 |

*Primary Examiner*—Benedict V. Safourek
*Attorney, Agent, or Firm*—Harold E. Meier

[57] ABSTRACT

A digital pulse detector circuit having a selectable false alarm rate receives an analog input signal containing periodic correlation pulses in a background of noise. The input signal is sampled and digitized to produce a series of digital input samples which are taken for regular time slots within a series of time frames. Each of the digital input samples is summed with a previously stored digital summation sample to produce a new summation digital sample that replaces the summation sample read out of memory to produce the new summation sample. The new digital summation sample is compared to a threshold value to produce a signal confirmed signal to indicate detection of the correlation pulse. When a set number of summation steps are carried out for a particular time slot and the summation value for that time slot has not exceeded the threshold value, that time slot is reset to zero to eliminate accumulated noise. The threshold values of the integrated pulses can be set at the threshold detector to enable the operator to select the false alarm rate.

7 Claims, 5 Drawing Figures

FIG. I

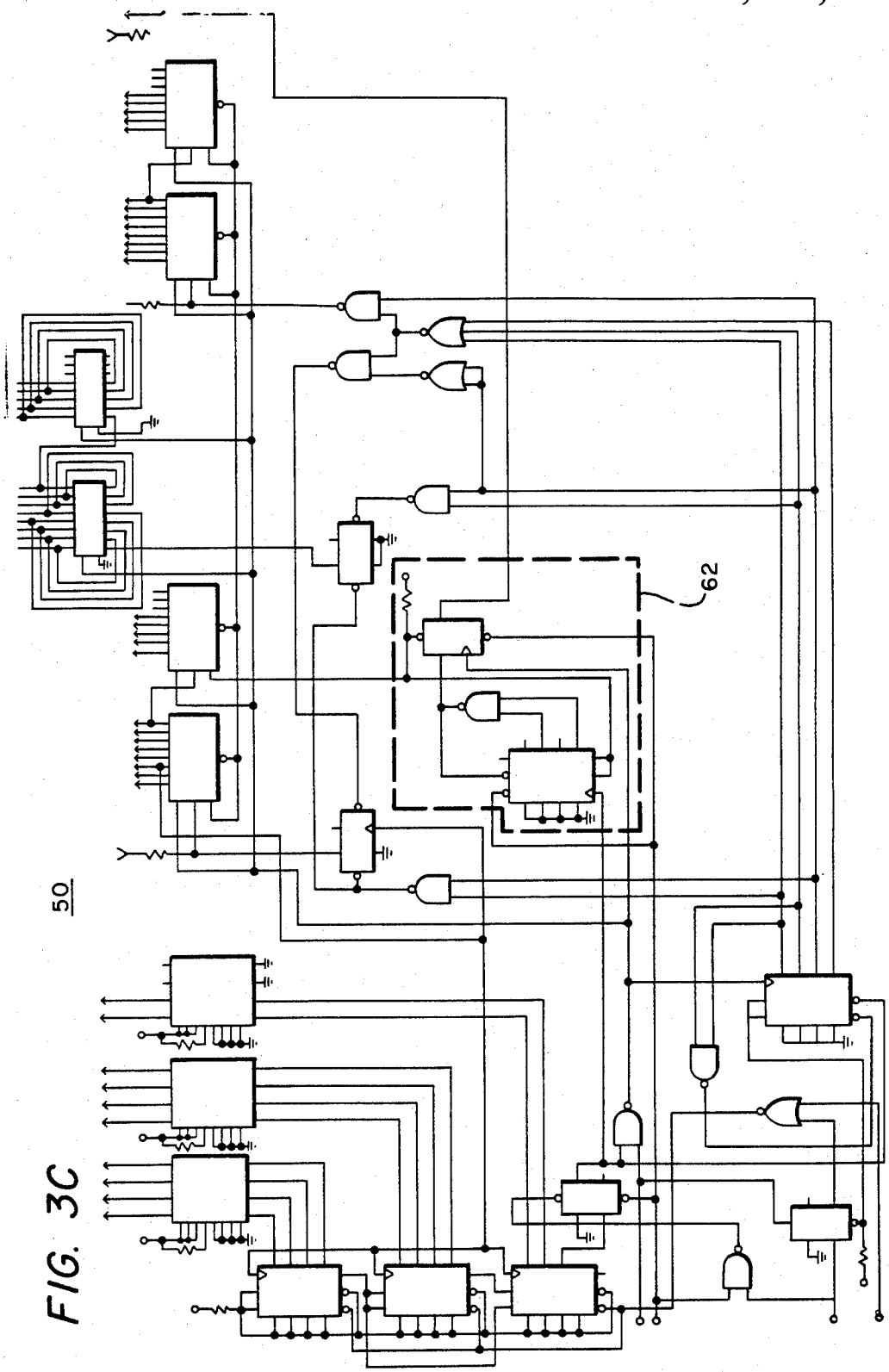

DIGITAL PULSE DETECTOR CIRCUIT HAVING SELECTABLE FALSE ALARM RATE

TECHNICAL FIELD

The present invention relates to a method and apparatus for the detection of repeated pulse signals in a noisy environment and more particularly to the selective setting of a false alarm rate.

BACKGROUND OF THE INVENTION

In spread spectrum receiver systems, correlation pulses are periodically generated by a correlator in the receiver system. The correlation pulses are generally mixed with a background of noise. The receiver system must detect the repeated correlation pulse in order to establish lock and receive the transmitted information.

In communication systems which produce periodic correlation pulses, there is a trade-off between the probability of detecting the correlation pulse and the generation of false alarms due to the erroneous detection of correlation pulses. The allowable false alarm rate can vary substantially from one application to another and can require change from one time to another for a given system.

Therefore, there exists a need for a method and apparatus for detecting a repeated correlation pulse within a data stream in a noisy environment. The possibility of detecting the pulse and of incurring false alarms must also be adjustable to meet the requirements of different communication systems and of changing requirements for a particular system.

SUMMARY OF THE INVENTION

A method and apparatus is disclosed for detecting a repeated pulse in an input signal in which the input signal is included within a noisy environment. The method samples the input signal during sequential time slots in a repeated time frame to produce a sequence of input samples. A plurality of mathematically processed samples have been previously stored in a memory wherein each processed sample corresponds to one of the time slots within the time frame. Each of the input samples when received is mathematically processed with the stored processed sample for the corresponding time slot to that of the input sample to produce a corresponding new processed sample. Each of the new processed samples is stored in the memory in place of the stored processed sample for the corresponding time slot, thus the new processed sample replaces the previously stored processed sample. Each new processed sample is also compared with a preset threshold value. An output signal is generated when one of the new processed samples equals or exceeds the threshold value. A stored processed sample is set to an initial state when the new processed sample for the corresponding time slot has reached the threshold value. A stored processed sample is also set to an initial state after it is read out of memory when the new processed sample for the corresponding time slot has not reached the threshold value after a set number of said mathematical processing steps have been carried out for the corresponding time slot.

BRIEF DESCRIPTION OF THE DRAWINGS

For a more complete understanding of the present invention and the advantages thereof, reference is now made to the following Detailed Description taken in conjunction with the accompanying Drawings in which:

FIGS. 3A–3C are schematic illustrations of a particular embodiment for a digital correlation pulse processor having a selectable false alarm rate in accordance with the present invention.

DETAILED DESCRIPTION OF THE INVENTION

Figure 1:
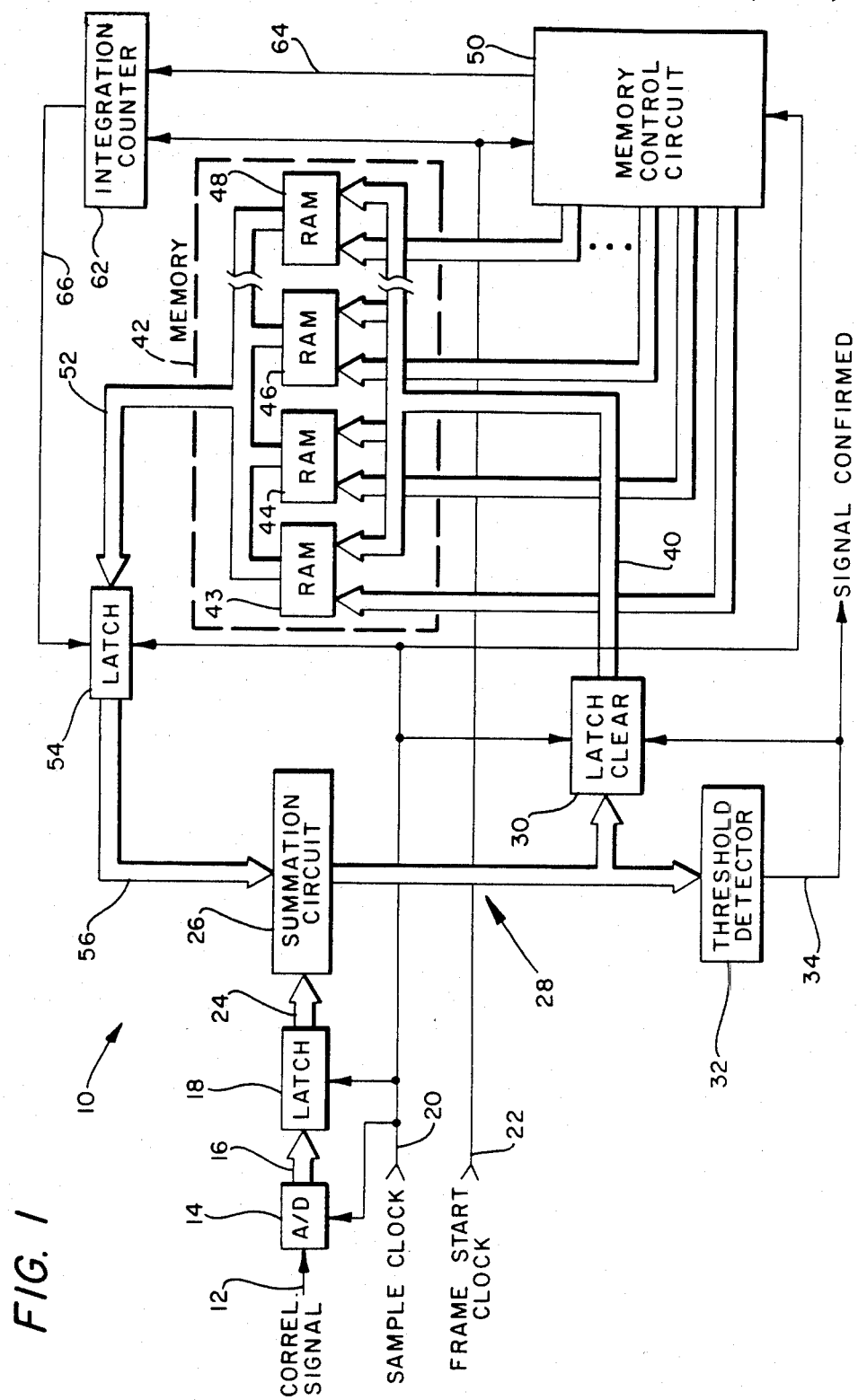
FIG. 1 is a block diagram of the digital correlation pulse processor of the present invention.
Figure 2:
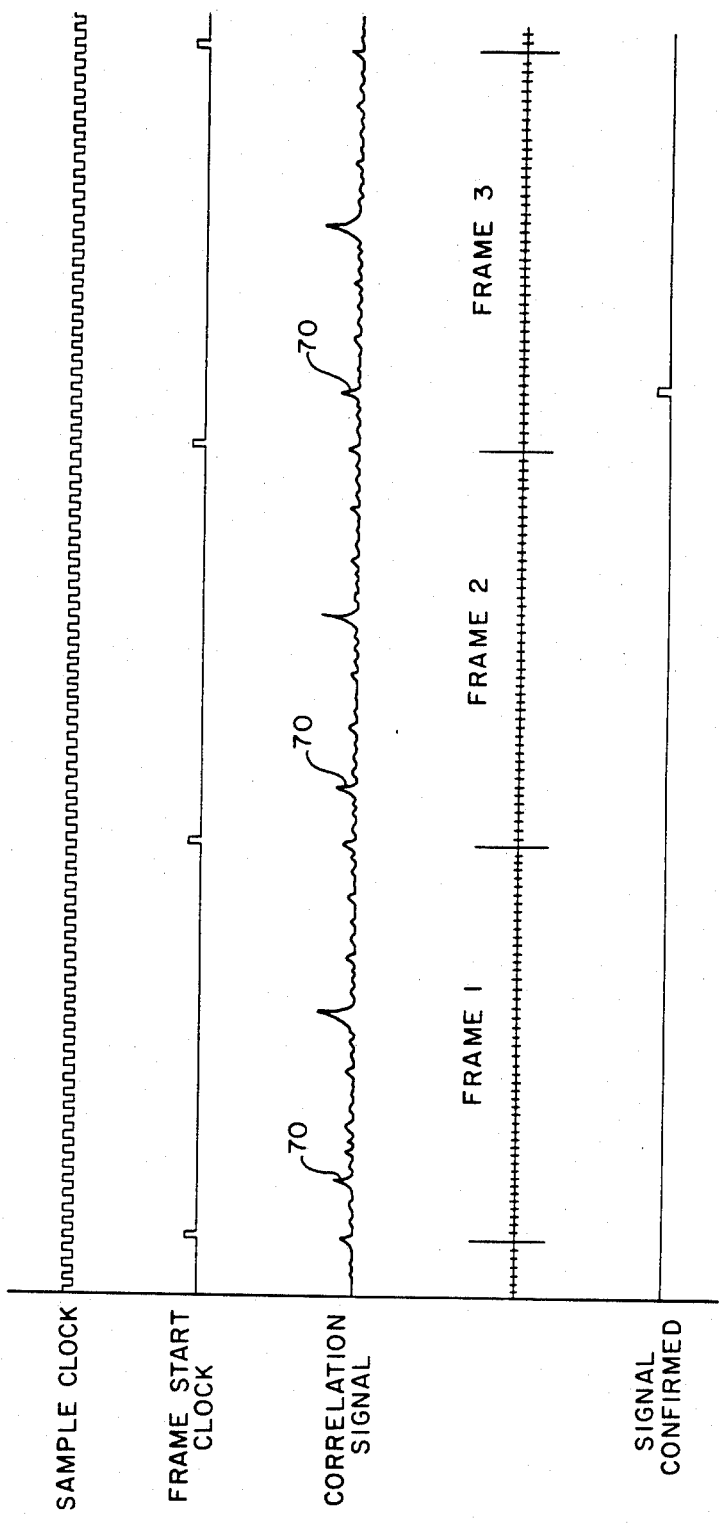
FIG. 2 is an illustration of various data and timing signals present for the apparatus illustrated in FIG. 1.

A block diagram of a digital correlation pulse processor is illustrated in FIG. 1 and is designated generally by the reference numeral 10. An analog correlation signal is input through a line 12 to an analog-to-digital converter 14. The correlation signal is illustrated in FIG. 2. The analog correlation signal is sampled at a periodic rate to produce digital input samples which are transmitted through a path 16 to a latch 18. The path 16 is shown as a bus to represent the transmission of a plurality of bits in parallel for the preferred embodiment of the invention. However, the transmission could also be serial.

A sample clock signal is input on a line 20 to sequence the operation of various circuits within the processor 10. The sample clock signal is input to the clock terminals of converter 14 and latch 18. A frame start clock signal is input on a line 22 also to provide timing for the sequencing of circuits within processor 10. The sample clock and frame start signals are illustrated in FIG. 2.

Referring further to FIG. 1, the latch 18 stores a digital sample which is received from the converter 14. The stored digital sample in latch 18 is transmitted through a path 24 to a first input of a summation circuit 26.

The output signal of the summation circuit 26 is transmitted through a path 28 to a latch 30 and to a threshold detector circuit 32. The latch 30 stores the summation signal produced by the circuit 26. The threshold detector circuit 32 produces a signal confirmed signal on a line 34 when the amplitude of the output signal of the circuit 26 reaches a preset threshold value. The signal confirmed signal is input to the clear terminal of latch 30. When a signal confirmed signal is received by latch 30, the quantity stored in the latch is reset to an initial state, zero.

The digital quantity stored in latch 30 is transmitted through a path 40 to a memory 42. The memory 42 includes a plurality of random access memories 43, 44, 46 and 48. The actual number of random access memories utilized within memory 42 is dependent upon the nature of the application of processor 10 and the size of the individual memories.

The memories 43, 44, 46 and 48 receive address information for read and write cycles and other control signals from a memory control circuit 50. Both the sample clock and the frame start clock signals are input to circuit 50. In response to the clock signals, circuit 50 generates sequential memory addresses for reading and writing to the individual memory locations within memory 42.

The digital quantities read from memory 42 are transmitted through a path 52 to a latch 54. The operation of latch 54 is sequenced by the sample clock signal received through line 20. Latch 54 serves to hold a digital sample received from memory 42. The digital sample stored in latch 54 is transmitted through a path 56 to the second input of the summation circuit 26.

An integration counter circuit 62 receives a control signal through a line 64 from the memory control circuit 50. The sequencing of counter 62 is controlled by the frame start clock signal received through line 22. The integration counter 62 counts the number of summation steps carried out for each time slot of the time frame. Whenever a preset number of summations have been carried out for a particular time slot and that that time slot has not been reset through latch 30, the counter 62 generates an output which is transmitted through a line 66 to set latch 64 to an initial state, zero. When latch 54 has been so set, the summation circuit 26 is provided with a zero input through path 56.

A number of timing signals and waveforms for circuit 10 are illustrated in FIG. 2. The sample clock and frame start clock signals are periodic pulse signals which sequence the operation of the various circuits within processor 10. The analog correlation signal input on line 12 comprises both correlation pulses and noise. The correlation pulses, shown as pulses 70, are spaced at even intervals within the correlation signal. The correlation pulse signals are included in a background of noise in which the amplitude of the noise can exceed the amplitude of the correlation pulses. The noise, however, does not have a pulse component recurring at the interval of the correlation pulses.

The correlation signal is arbitrarily divided into frame periods as defined by the frame start clock. Each frame is divided into time slots which are defined by the sample clock signal. Each frame contains the same set of time slots. The processor 10 illustrated in FIG. 1 generates a signal confirmed signal after receipt of a sufficient number of correlation pulse signals which have a combined amplitude that exceeds a preset threshold. The signal confirmed signal is illustrated in FIG. 2 for receipt of the pulse signal 70.

Operation of the processor 10 of the present invention is now described in reference to FIGS. 1 and 2. The analog correlation signal is received through line 12 and periodically sampled by the analog-to-digital converter 14. An analog sample is taken for each time slot of each frame. The analog samples are converted to digital input samples which are transmitted through path 16 and stored in latch 18. The digital sample stored in latch 18 is then provided as the first input to summation circuit 26. A stored processed sample has previously been retrieved from memory 42 and stored in latch 54. The quantity in latch 54 serves as the second input to summation circuit 26. The quantities from latches 18 and 54 are summed to produce a new processed digital sample which is stored in latch 30. When the new processed digital sample reaches a preset threshold, the detector circuit 32 generates an output signal to show that the correlation signal has been confirmed. The confirmed signal, which is transmitted through line 34, is provided to clear latch 30 which sets the latch to a zero state.

When the latch 30 is not reset, it contains the new processed digital sample received from summation circuit 26. This new processed sample is then stored in memory 42 at the memory location from which the stored process sample was retrieved and was used in the formation of the new processed sample. The memory 42 includes a memory location for each of the time slots for a time frame. The signal samples for each of the recurring time slots are summed in the memory 42 at a separate location for each time slot. The memory control circuit 50 reads out the appropriate memory location which corresponds to the time slot of the digital input sample which is input to latch 18. Thus, each time slot is digitally integrated over a series of frames.

The integration counter 62 counts the number of summation steps which have occurred for each time slot and monitors the resetting of each time slot by the latch 54. Whenever a set number of summation steps have occurred for a given time slot and that time slot has not been reset, integration counter 62 generates a signal which serves to reset latch 54 for that time slot. If a correlation pulse is not detected over a preset number of samples, the corresponding memory location is set to zero to renew the integration process. The noise is sampled along with the correlation pulses and will also be integrated. Thus, the memory locations must be periodically reset to eliminate the accumulation of the noise samples. Alternatively, if the analog-to-digital converter 14 operates to provide a signed magnitude, the integration counter 62 is operational only during circuit start-up. That is, summation circuit 62 sums both positive and negative values, which averages to zero for noise. Since the noise does not occur at a periodic rate as with the correlation pulses, the integrated sum of the noise should be substantially less than the integrated sum of the correlation pulses.

For the embodiment illustrated in FIG. 1, the circuit 26 forms a summation mathematical function. The present invention, however, is not limited to only a summation mathematical process. Further mathematical processes which can be utilized in place of summation are multiplication, and Fast Fourier Transform.

Figure 3A:
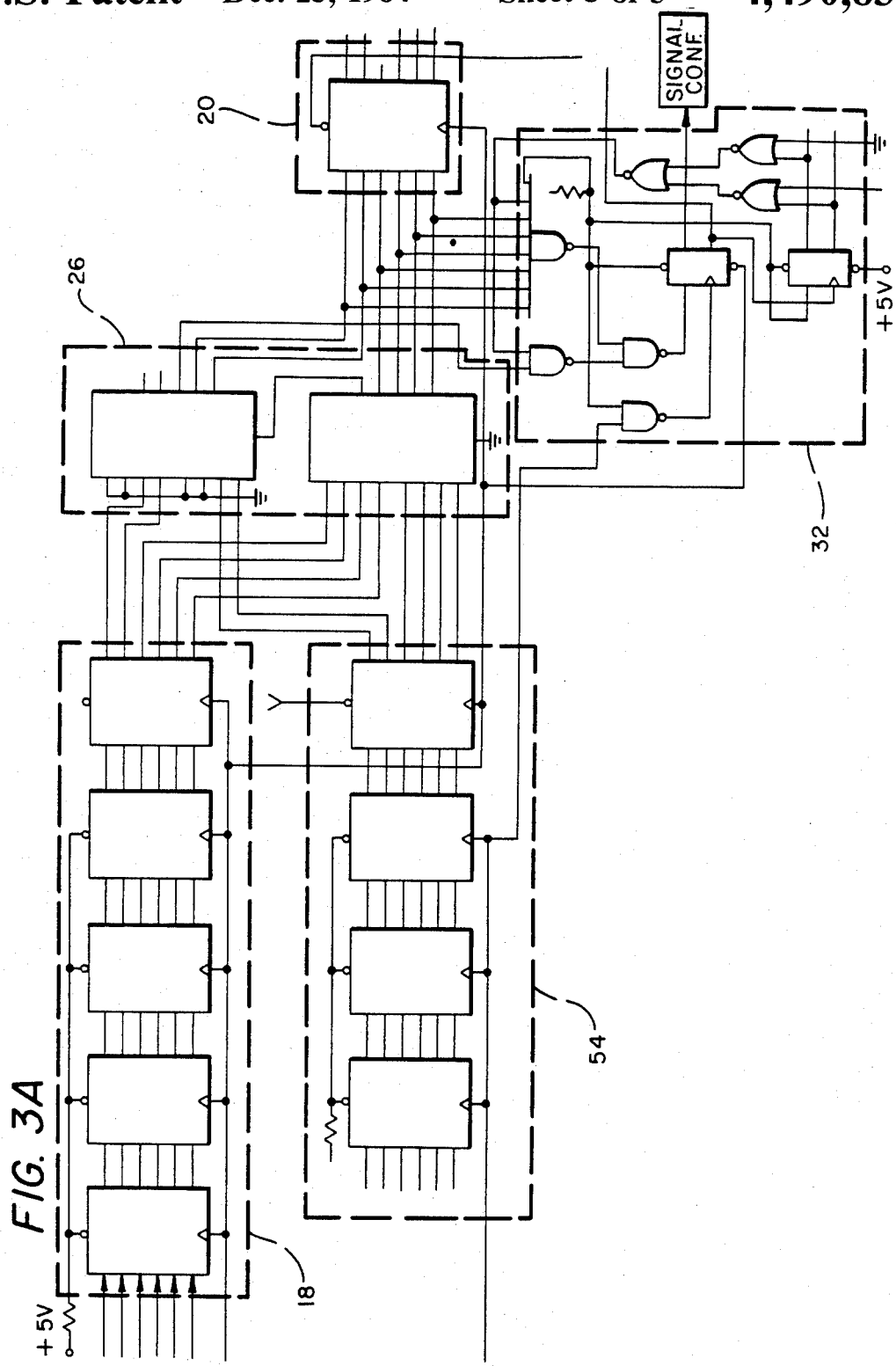
Figure 3B:
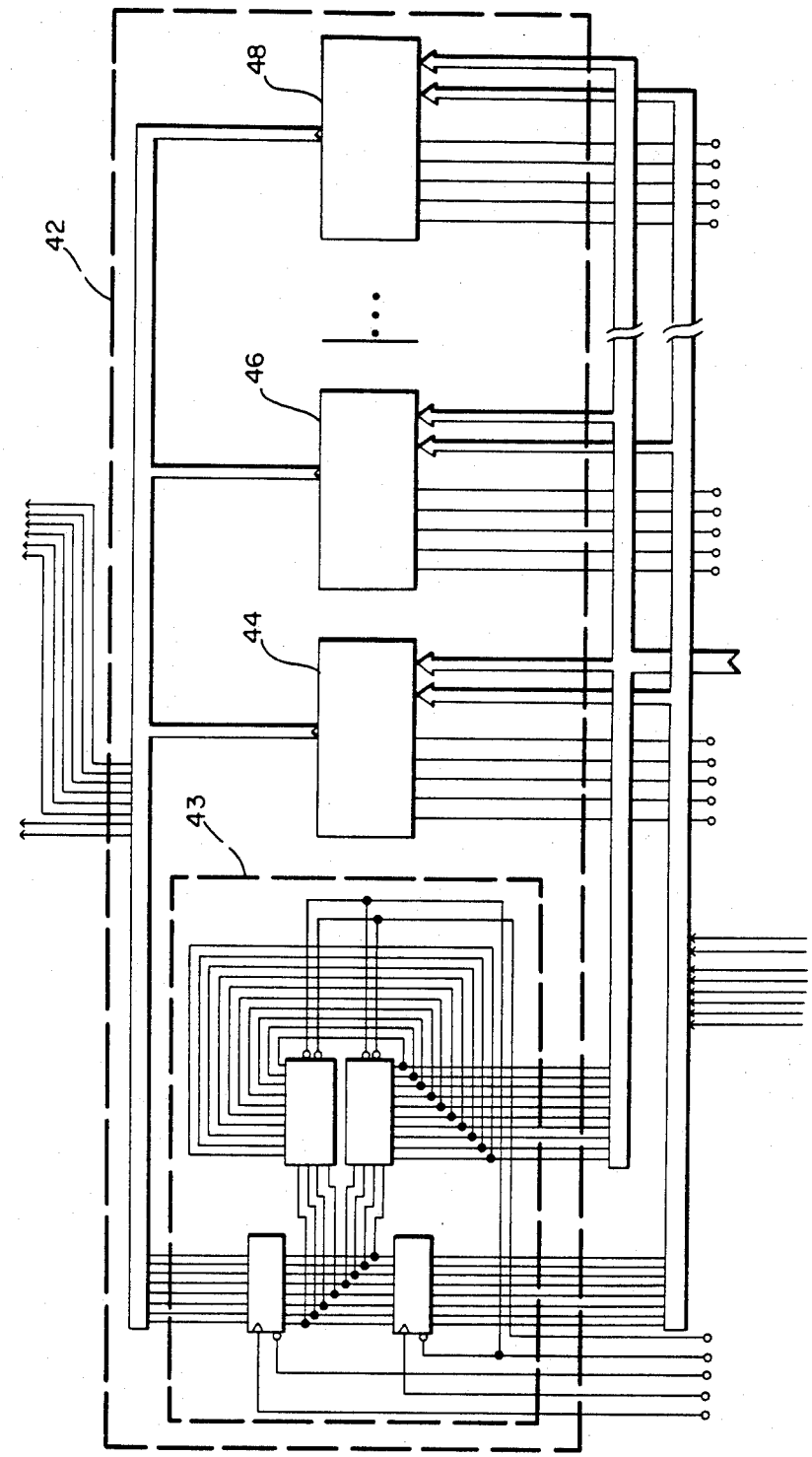

Referring now to FIGS. 3A–3C, there is shown a detailed schematic diagram of a digital pulse detector circuit which essentially corresponds to the block diagram processor 10 illustrated in FIG. 1. The part numbers are illustrated for the integrated circuits and dashed lines enclose groups of circuits and are labeled to correspond to the similar circuits illustrated in FIG. 1.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

We claim:

1. A method for detecting a repeated pulse in an input signal existing in a noisy environment, comprising the steps of:

sampling said input signal during sequential time slots in a repeated time frame to produce a sequence of input samples;

processing each said input sample with a stored processed sample for the corresponding time slot to that of the input sample to produce a corresponding new processed sample;

storing each of the new processed samples in place of the stored processed sample for the corresponding time slot;

comparing each new processed sample with a threshold value;

generating an output signal when one of the new processed samples reaches the threshold value;

setting the stored processed sample to an initial state when the new processed sample for the corresponding time slot has reached the threshold value; and setting the stored processed sample to an initial state when the new processed sample for the corresponding time slot has not reached the threshold value after a set number of steps of processing each input sample have occurred for that time slot.

2. The method recited in claim 1 wherein the step of processing each said input sample comprises adding each input sample to the stored processed sample for the corresponding time slot to produce a corresponding new processed sample.

3. A method for detecting a repeated pulse within an input signal existing in a noisy environment, comprising the steps of:

sampling said input signal during sequential time slots in a repeated time frame to produce a sequence of digital input signals;

sequentially adding each of said digital input samples to a stored digital summation sample for the time slot corresponding to the digital input sample to produce new digital summation samples;

sequentially storing each of the new digital summation samples in place of the stored digital summation sample for the corresponding time slot;

comparing each new digital summation sample with a threshold value;

generating a pulse recognition output signal when a new digital summation sample reaches the threshold value;

setting the stored digital summation sample to an initial state when the new digital summation sample for the corresponding time slot reaches the threshold value; and setting the stored digital summation sample to an initial state when the new digital summation sample has not reached the threshold value after a set number of summation steps has occurred for that time slot.

4. A method for detecting a repeated pulse in an input signal existing in a noisy environment, comprising the steps of:

sampling said analog input signal during sequential time slots in a repeated time frame to produce a sequence of analog signal samples;

converting said analog signal samples into digital signal samples;

storing said digital signal samples in a first latch;

storing summation signal samples in a memory having a memory location for each of the time slots in the time frame;

reading out from memory the stored summation signal sample at the location corresponding to the time slot for the digital signal in said first latch;

storing the summation signal sample read out of the memory in a second latch;

summing the signal samples in said first and second latches to produce a new summation signal sample;

storing the new summation signal sample in a third latch;

transferring the signal quantity in said third latch into the memory location corresponding to the stored signal sample used in the summation step to form the new summation signal;

comparing the new summation signal to a threshold value;

generating a pulse recognition output signal when the new summation signal reaches the threshold value;

setting said third latch to a zero state when the new summation signal reaches the threshold value and before the new summation signal is transferred to said memory; and setting said second latch to a zero state when the new summation signal has not reached the threshold value after a set number of said steps of summing have occurred for the corresponding time slot.

5. Apparatus for detecting a repeated pulse in an input signal existing in a noisy environment, comprising:

means for sampling the input signal during sequential time slots in a repeated time frame to produce a sequence of input samples;

a memory having storage locations corresponding respectively to said time slots;

means for reading from said memory the quantity at the location therein having the time slots corresponding to that of the input sample;

means for receiving and mathematically processing the input sample and the quantity read from said memory for generating a processed signal sample;

means for transferring the processed signal sample to the location in said memory corresponding to the time slot of the input sample mathematically processed in the means for receiving to produce the processed signal sample;

means for comparing the processed signal sample with a threshold value;

means for generating an output signal when the processed signal sample has reached the threshold value;

means for setting the quantity in one of said memory locations to an initial state when the corresponding processed signal sample has reached the threshold value; and means for setting the quantity in one of said memory locations to an initial state when the corresponding processed signal sample has not reached the threshold value after the occurrence of a set number of the mathematical processing steps for the corresponding time slot.

6. The apparatus recited in claim 5 wherein said means for receiving and mathematically processing comprises a summation circuit for producing the processed signal sample as the sum of the input sample and the quantity read from said memory.

7. Apparatus for detecting a repeated pulse in an input signal existing in a noisy environment, comprising:

an analog-to-digital converter for receiving and sampling the input signal during sequential time slots in a repeated time frame to produce a sequence of digital input samples;

a first latch connected to said converter for storing one of the digital input samples;

a memory having a plurality of storage locations, each location corresponding respectively to one of the time slots;

means connected to said memory for accessing said memory to read out the quantity at the memory location therein corresponding to the time slot of the digital input sample provided to said converter;

a second latch connected to said memory for receiving signal samples read out from said memory;

means connected to said first latch and said second latch for receiving and sampling the samples therein;

a third latch connected to said means for receiving and summing for receiving the quantity produced thereby;

said means for accessing said memory including means for transferring the sample quantity in said third latch to said memory at a location therein from which the quantity was read out for use in the summation to produce the sample quantity being transferred to said memory;

means connected to said means for receiving and summing for generating an output signal indicating recognition of a pulse when the output of said means for receiving and summing reaches a threshold value;

means connected to said third latch for setting said third latch to a zero state when the output of said means for receiving and summing reaches the threshold value; and means connected to said second latch for setting said second latch to a zero state when a set number of summation steps have been executed for the time slot corresponding to the memory location read out to fill said second latch.

* * * * *

UNITED STATES PATENT AND TRADEMARK OFFICE
CERTIFICATE OF CORRECTION

PATENT NO. : 4,490,831

DATED : December 25, 1984

INVENTOR(S) : Billy R. Poston, et al.

It is certified that error appears in the above-identified patent and that said Letters Patent is hereby corrected as shown below:

Abstract, line 5, before "The", insert the sentence --The circuit detects the correlation pulses which have regular intervals and rejects the nonperiodic noise.-- lines 9-10, change "summation digital" to --digital summation--.

line 10, after "digital sample", insert a period.

line 10, delete "that".

line 10, before "replaces", insert --The new summation digital sample then--.

line 12, before "The", insert the sentence --The memory includes a memory location for each of the time slots within the repeated time frame.-- line 18, before "The", insert --A plurality of correlation pulses can be detected within the time slot while--.

line 18, change "The" to --the--.

Signed and Sealed this

Tenth Day of September 1985

[SEAL]

Attest:

DONALD J. QUIGG

Attesting Officer     Acting Commissioner of Patents and Trademarks - Designate